Feb. 24, 1953 — J. V. SCHAFER — 2,629,565
FISHING REEL
Filed Sept. 5, 1947
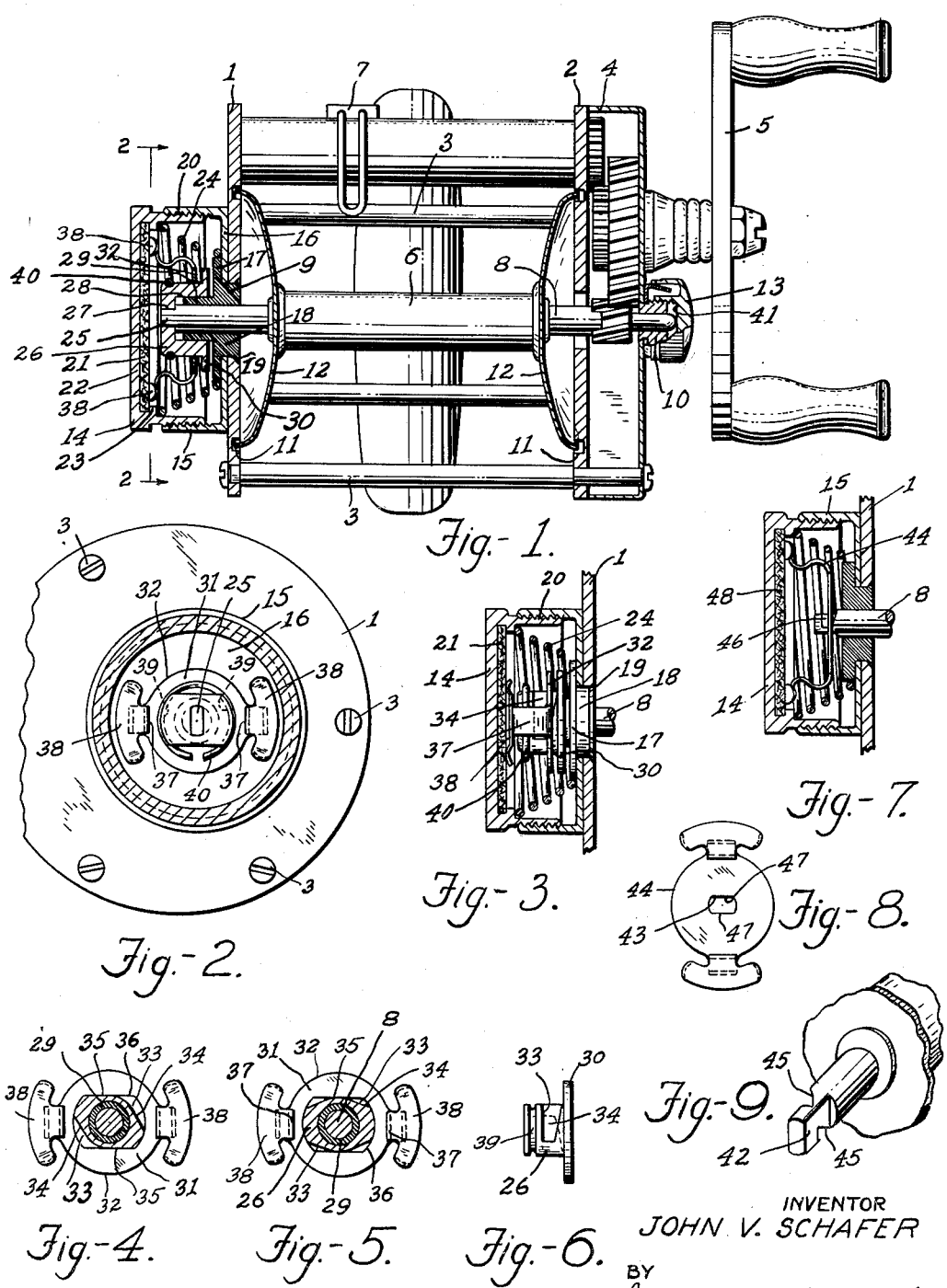
INVENTOR
JOHN V. SCHAFER
BY
Charles S. Penfold
ATTORNEY Patented Feb. 24, 1953

2,629,565

UNITED STATES PATENT OFFICE 2,629,565

FISHING REEL

John V. Schafer, Bronson, Mich.

Application September 5, 1947, Serial No. 772,248

6 Claims. (Cl. 242—84.5)

This invention relates generally to fishing tackle and more particularly is directed to a fishing reel embodying improved principles of design and construction.

The principal object of the invention is to provide unique means for preventing what is known as back-lash.

The invention involves a friction mechanism disposed in a housing carried by one of the end plates of a frame supporting the spool unit, such mechanism including a friction member, and a friction element movable with the shaft, and means for automatically controlling the frictional coefficient between such member and element to obtain the desired drag or braking effect on the spool unit when casting. More specifically, the spool shaft is provided with cam means and the friction element with portions operatively related to such cam means in a manner whereby when a cast is made, the element will be moved outwardly along the shaft to bring such element and friction member into frictional relationship, and when the line is reeled in, such element will be rendered substantially inoperative to produce friction.

Another object of the invention is to design and construct the parts in such a relationship that the frictional drag varies in direct proportion to the speed of the spool when a cast is made.

Another object of the invention is to construct and arrange the friction member and friction element in the housing, above referred to, in such a way that the points of frictional contact therebetween are located a predetermined appreciable radial distance from the rotational axis of the spool unit in order to obtain the greatest mechanical advantage where most desired, and at the same time provide a well balanced assembly whereby a slight movement of an operating member may increase to a considerable extent the frictional drag between such friction member and element.

One of the particular objects of the invention is to provide a mechanism which can be economically manufactured and assembled in substantially any standard or conventional casting reel now in use without materially modifying or altering its original identity.

A further object of the invention is to provide a reel in which the friction mechanism is made readily accessible without disassembling the reel frame; and means whereby to prevent accidental displacement of certain parts thereof when the cover of the housing is removed.

Other attributes of the invention reside in its simplicity of design and construction, durability, sensitivity to adjustment, and smooth operation.

Additional objects and advantages of the invention will become evident after the description hereinafter set forth is considered in conjunction with the drawing annexed hereto.

In the drawing, wherein like parts are identified by the same numerals:

Figure 1 is a side view of the reel, portions of which are broken away to clearly illustrate the application of the invention thereto;

Figure 2 is a transverse section taken substantially on line 2—2 of Figure 1 with certain parts in a different position and other parts removed;

Figure 3 is a section ttaken through an appropriate part of the reel depicting the relative positions of the cam means and friction element to produce friction when a cast is made;

Figures 4 and 5 illustrate the details of construction embodied in the friction element and cam means, particularly the relative inoperative and operative positions of the friction element, respectively, as viewed looking in the direction of the arrows in Figure 2;

Figure 6 is a side view of the cam means adapted for association with the spool shaft;

Figures 7 through 9 are directed to another embodiment or modification of the invention, Figure 7 illustrating an arrangement in which the friction element is adapted to engage cam means formed integrally on the spool shaft at a point located exteriorly of the reel frame;

Figure 8 is a plan view of the friction element employed in such modification; and Figure 9 is an enlarged perspective view of one extremity of the spool shaft showing the character of the cam means.

The reel exemplified in the drawing, except for the application of the invention thereto, is generally of a conventional character and includes an end plate 1 and a head plate 2 which are detachably connected together by tie rods 3, the latter also serving to hold a cap member 4 against the head plate to provide, in combination with the head plate, an enclosure for the gear train. A crank 5 is mounted on the cap for operating the spool unit 6 and a level wind mechanism 7 through such train.

The shaft 8 for the spool is journalled in a pair of stationary or fixed bearings 9 and 10 carried by the end plate 1 and cap 4, respectively. The opposed faces of the plates are provided with the customary annular clearance grooves 11 for receiving the peripheries of the spool flanges 12.

The spool unit may be centered or properly positioned in the frame by means of an adjustable member 13 carried by bearing 10 and an operating member 14 carried by a housing 15, the latter being supported against the outer face of the end plate 1 to form a chamber for the friction mechanism constituting the invention.

The housing 15 is preferably made in the form of a cup having a base wall 16. The bearing 9, embodies improved principles of design and construction and, includes a round radial flange 17 which engages the base wall 16 of the housing and a portion 18 which extends through holes provided therefor in such wall and the end plate and is upset as indicated at 19 to permanently and rigidly support the housing and bearing on the plate. The radial flange 17 is of such a diameter that it lends stability to the housing. The housing is preferably internally threaded to receive an exteriorly threaded cylindrical portion 20 provided on the operating member 14 whereby the friction mechanism may be controlled as desired.

A friction disc member 21, of some desirable material, such as leather, is secured against the inner face of the end wall 22 of the operating member 14, by an inturned circumferential flange portion 23 formed on the side wall of the member, whereby to uniformly confine the round marginal edge of the friction member, and at the same time provide an abutment for the large end of a conical compression spring 24, the other smaller end of the spring receiving the radial flange 17 to maintain the spring in concentric relation to the spool shaft. This spring serves to hold the operating member 14 in place after it has been adjusted to the desired position. The large end of the spring is placed under tension when normally received in the operating member 14 in order to hold the same together when such member is disconnected from the housing, thereby preventing accidental loss. If necessary a suitable adhesive may be employed to assist in firmly anchoring the friction member 21 in place.

One extremity of the shaft beyond the spool is preferably provided with a portion 25, generally rectangular in cross-section. A cam member 26, generally rectangular in cross-section, is mounted for movement with the shaft by providing the end wall of such member with a rectangular hole 27 which receives the portion 25. Obviously, other means may be employed for obtaining a suitable detachable connection between the cam member and shaft. The cam member has a bore 28 which rotatably receives an axial bearing portion 29 forming an integral part of the bearing 9. It is desirable that the bearing surfaces between the cam member and bearing be smooth and sufficient to impart stability to the cam member to prevent displacement thereof on the shaft. An outwardly extending radial flange 30 is formed on the cam member and serves as an abutment for the hub portion 31 of a friction element 32. Some measure of friction between the cam member and bearing 9 is alleviated by maintaining the flanges 17 and 30 thereon in spaced apart relation, as clearly illustrated in Figure 1 of the drawing.

Diagonal corners of the cam member are provided with interruptions or notches 33, the bases thereof forming corresponding thread-like or spiral-like cam surfaces 34 which cooperate with the parallel marginal edges 35 of an aperture 36 provided in the hub portion 31 of the friction element, the purposes of which will be described more in detail subsequently. The friction element 32 is preferably provided with a pair of diametrically disposed arms 37 which extend laterally and outwardly from the hub portion. The extremities of these arms are provided with corresponding arcuate contact portions 38 for operatively engaging the friction member 21 in a well balanced manner at locations spaced substantially remote from the rotational axis of the spool. As clearly illustrated in Figure 3, the contact portions 38 may include a pair of projections which engage the friction member, or if found desirable, substantially the full length of the arcuate portions may be fashioned to engage such member. Each arm is preferably made resilient and in the form of an ogee curve to impart sensitivity, adjustability, and durability to the friction element under all operating conditions. The contact portions 38 are of a size to easily slide or skate on the friction member, and their extreme ends formed, as illustrated, so that such portions will not bite into or damage the smooth contacting surface of the friction member. This factor of locating the contact area between the friction member and the element at an appreciable distance from the spool axis is of major importance because a greater mechanical advantage is obtained than when disposed closer to such axis, thereby promoting a well balanced operating assembly. In order to prevent accidental separation of the cam member and the friction element when the operating member 14 is removed from the housing, the cam member is provided with exterior grooves 39 which detachably receives a split retaining ring 40.

As illustrated in Figure 1, the reel has been adjusted for casting, with the contact portions 38 of the friction element in light bearing engagement with the friction member 21. The parts are so constructed and arranged that when a cast is made the friction element will move and cause the marginal edges 35 defining the aperture 36 in the friction element to ride along the cam surfaces 34 of the cam member, as illustrated in Figure 5, so that such member is automatically moved spirally outwardly to press the contact portions 38 into the desired frictional relationship with the friction member 14, such resistance, as alluded to above, being variable and subject to the speed of the spool unit. In other words, means are provided for automatically controlling the frictional drag between the element and member, so that when the spool travels at a relatively slow rate there is less frictional resistance than when the rate is higher. As a result, the desired drag or braking effect is applied to the spool unit at all times to prevent over spinning thereof and line entanglements resulting therefrom.

When the line is being reeled in, the friction mechanism is rendered substantially inoperative, as illustrated in Figure 4, although the parts thereof are normally in light bearing engagement. The arrangement is such that when required the operating member 14 may be manipulated to control the position of the parts comprising such mechanism.

Attention is directed to the fact that a clearance opening is provided in the head plate for the shaft and that the member 13 on the bearing 10 is of such a character that a planar abutment 41 thereon may engage the end portion of the shaft. There is also very little friction between the cam member and bearing 9 and none between the spool flanges and the frame plates 1 and 2, when the reel is operated as intended. This predetermined relationship between the parts reduces friction to a minimum and provides a quiet and smooth acting reel with the friction element and member more or less normally in contact at all times.

Of further importance is the fact that the friction mechanism is made readily accessible, due to the location of the housing therefor.

The embodiment of the invention illustrated in Figures 7 through 9 differs from the embodiment above described by providing one extremity of the spool shaft with integral cam means. More specifically in this respect, the shaft is provided with a portion 42, preferably rectangular in cross-section which is received in an aperture 43 formed in the hub portion of a friction element 44 so that such element will rotate with the shaft. Diagonally disposed corners of the portion are provided with interruptions or notches 45, the bases of such notches being constructed and arranged to provide generally thread-like or spiral-like cam surfaces 46, one shown in Figure 7, which cooperate with the marginal edges of the aperture 43, preferably the parallel edges 47 thereof to urge the friction element spirally toward a friction member 48 when a cast is made, the performance of the friction mechanism in casting and retrieving the line being substantially the same as described above in connection with the first embodiment of the invention. The embodiment of Figures 7 through 9, avoids the use of a separate cam member, and thereby reduces the cost of materials, machining, and assembly, without sacrificing any of the advantages contemplated by the invention.

Having thus described my invention, it will be obvious that various immaterial modifications may be made in the same without departing from the spirit of the invention as defined in the claims.

I claim:

1. A reel comprising a frame having an end plate, a spool having a shaft rotatably mounted on said frame, a cam on said shaft, a relatively small housing secured in an exposed position to the central portion of the end plate, a friction member mounted on the housing, and a friction element carried by the cam in a manner whereby rotation of the spool will effect relative movement between said element and said member to produce a braking action on the spool.

2. A reel comprising a frame having a head plate and an end plate, shaft means supported by said plates, a spool fixed on said shaft means, a support secured to and in spaced apart relationship to the exterior of the end plate, a friction member carried by said support, and a friction element mounted for movement with said shaft means, said friction element being located in the said space and provided with a pair of arms for cooperation with the friction member to effect a braking action on the spool, and said support being movable axially relative to the friction element.

3. A reel comprising a frame, a housing secured exteriorly to an end of the frame, a spool unit having a shaft rotatably mounted on said frame and having an end disposed in the housing, a cam mounted on the said end of the shaft, cooperating means carried by said housing, and friction means carried by and co-acting with said cam for moving the friction means into engagement with said cooperating means to effect a braking action for controlling the rotation of said spool unit.

4. A reel comprising a frame, a shell secured exteriorly to an end of the frame, an adjustable cover for said shell, cooperating means carried by said cover, a spool unit having a shaft rotatably mounted on said frame with an end disposed in the shell, cam means on said end of the shaft, friction means engageable with said cam means for urging the friction means into engagement with said cooperating means to obtain a variable braking action for controlling the rotation of said spool unit, and a spring disposed in said shell and bearing against the cover for normally holding the cover in any position to which it may be adjusted.

5. A frame including a pair of end plates secured together in spaced relation, a pair of bearings carried by said plates, a shaft journaled in said bearings, a spool mounted for movement with said shaft, a housing secured to one of said plates by one of said bearings, a cover for said housing, a friction member mounted on said cover, cam means disposed in said housing carried by said shaft, a friction element mounted on said cam means, said element and cam means being constructed and arranged whereby when the spool is rotated such element will move slightly about the cam means and exert pressure on the friction member to retard the rotation of the spool.

6. A frame, a pair of bearings on said frame, a spool having a shaft journaled in said bearings, a housing carried by said frame and having a portion spaced therefrom, a friction member secured to said portion, means integral with the shaft arranged in said housing, and a friction element cooperating with said means in a manner whereby when the spool is rotated said element will automatically exert pressure against the friction member to effect a braking action on the spool.

JOHN V. SCHAFER.

REFERENCES CITED

The following references are of record in the file of this patent:

UNITED STATES PATENTS

| Number | Name | Date |
|---|---|---|
| 563,964 | Vom Hofe | July 14, 1896 |
| 2,198,231 | Schafer | Apr. 23, 1940 |
| 2,290,662 | Willison | July 21, 1942 |
| 2,520,552 | Kilian | Aug. 29, 1950 |

FOREIGN PATENTS

| Number | Country | Date |
|---|---|---|
| 5,531 | Great Britain | Nov. 5, 1914 |